United States Patent [19]

Takabatake et al.

[11] 4,158,044

[45] Jun. 12, 1979

[54] METHOD FOR REMOVING NITRIC OXIDE FROM INDUSTRIAL GASES

[75] Inventors: Masaharu Takabatake; Haruo Tarui, both of Ichiharashi, Japan

[73] Assignees: Mitsui Shipbuilding and Engineering Co.; Mitsui Petrochemical Industries Ltd., both of Tokyo, Japan

[21] Appl. No.: 882,562

[22] Filed: Mar. 2, 1978

Related U.S. Application Data

[63] Continuation of Ser. No. 657,853, Feb. 13, 1976, which is a continuation-in-part of Ser. No. 459,283, Apr. 9, 1974.

[30] Foreign Application Priority Data

Apr. 9, 1973 [JP] Japan ................................. 48-40165

[51] Int. Cl.² ............................................. C01B 21/00
[52] U.S. Cl. ..................................................... 423/235

[58] Field of Search ................ 423/235, 239; 252/182, 252/190, 191; 55/68

[56] References Cited

U.S. PATENT DOCUMENTS 3,984,522  10/1976  Saito et al. .......................... 423/235

FOREIGN PATENT DOCUMENTS 1251900  10/1967  Fed. Rep. of Germany ........... 423/235
2416660  10/1974  Fed. Rep. of Germany ........... 423/235

*Primary Examiner*—G. O. Peters
*Attorney, Agent, or Firm*—Dann, Dorfman, Herrell and Skillman

[57] ABSTRACT

Nitric oxide is removed from industrial gases by absorption in an aqueous solution containing ferrous ion and a chelate ligand in the form of a ferrous chelate complex which captures the nitric oxide (NO) as a nitrosyl ligand.

9 Claims, 1 Drawing Figure

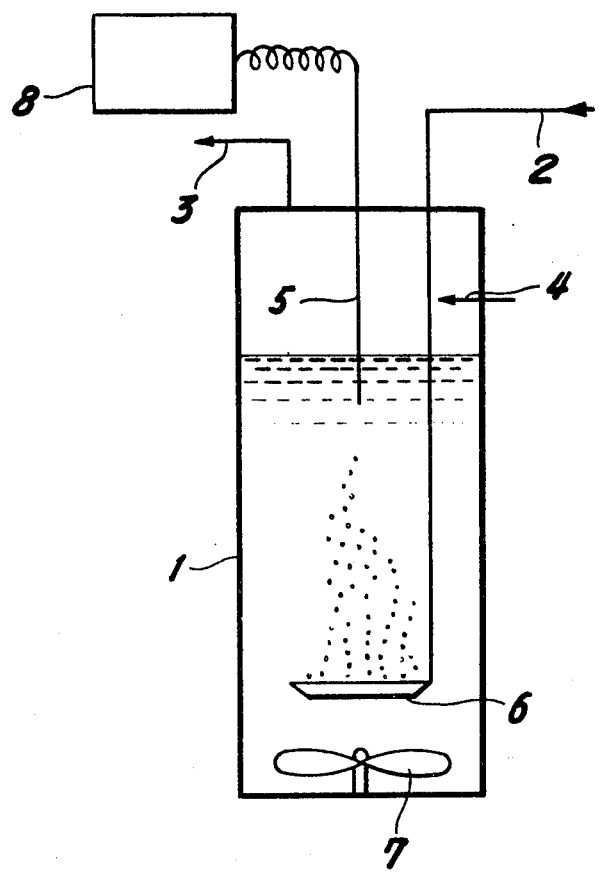

METHOD FOR REMOVING NITRIC OXIDE FROM INDUSTRIAL GASES

This is a continuation of application Ser. No. 657,853 filed Feb. 13, 1976, which is a continuation-in-part of application Ser. No. 459,283 filed Apr. 9, 1974.

THE PRIOR ART

Various methods have been proposed for solving the problem of removing nitric oxide from the industrial gases generated by combustion equipment and chemical processes, such as pickling or making of nitric acid. Among the well known methods are: chemical absorption; oxidation of NO to $NO_2$ followed by alkaline washing; physical separation by condensation, magnetic attraction and diffusion-permeation techniques; catalytic reduction of NO to nitrogen or ammonia; and electric corona discharge precipitation.

Many of the favored chemical absorption techniques are wet processes in which the removal of the NO is accomplished by its reaction with, or its solubility in, the liquid to which it is exposed. Nitric oxide is only slightly soluble in water so the preferred methods have relied on absorption by means of chemical reaction.

A method has been suggested in which solutions of chelate-complex forming salts are employed to absorb the nitrogen compounds by capturing them in the form of a ligand. German Pat. No. 1,251,900 suggests using a heavy metal ion selected from the Fourth Period of the Periodic System of the elements and an anionic chelate such as the carbonic acids (Polybasic carboxylic acids) and amino carbonic acids. The German patent specifically suggests $Fe_2(III)Na_6EDTA$ in the sole example of the patent. The ferrous form of the chelate is mentioned briefly elsewhere in the specification of this patent, with no indication of preference, and no unique properties attributed to it. The heavy metal ions selected from the Fourth Period of the Periodic System which would include 17 elements in addition to iron. Further, the claims are not limited to NO (nitric oxide) gas but recite nitrogen compounds such as hydrocyanic acid as capable of being removed.

This German patent further suggests that the operating pH range for these complexes is preferably between 6 and 8, although more alkaline solutions might give better results. In the coke oven gas, described in the German Patent, the NO content is on the order of 10 ppm (parts per million). This is a much lower concentration of NO than in the gases to be treated by the current invention.

U.S. Pat. No. 3,635,657 suggests using an aqueous solution of ferrous salt, at least one ammonium salt and free ammonia to reduce the NO in industrial gases. This is the only one-step process of which we are aware capable of removing NO from industrial gases or of substantially reducing the amount of NO in such gases having initial concentration of NO greater than 100 ppm. In this case, the ligands suggested by the patent are unidentate ligands, not chelates as in the present invention. The complex formed by these molecules is stable in a narrow pH range and $NH_3$ is always needed in excess. The application of this process would be limited to a gas, such as cracking discharge gas, where $O_2$ and $CO_2$ are present in minute amounts; otherwise the $NH_3$, which must be present in excess, undergoes carbonation and the ferrous complexes would be converted to ferric oxides and hydrates, thus frustrating the NO removal.

THE PRESENT INVENTION

The object of the present invention is to provide an improved method for directly and continuously absorbing nitric oxide (NO) from industrial gases having a relatively high concentration of NO, such as combustion gas or gases discharged from nitric acid plants, thus reducing the amount of NO introduced into the environment.

The present invention is characterized in that the nitric oxide (NO) containing gas is contacted with an aqueous solution containing a ferrous chelate complex produced by combining ferrous ion with a chelate ligand; more specifically, a chelate ligand in accordance with the list hereinafter set forth, thereby reacting and absorbing the NO in ferrous-chelate complex in the form of a nitrosyl ligand. Ferrous-chelate complex is very rapidly formed if ferrous ion and chelate ligand are present in aqueous solution. The concentration of materials in the aqueous solution containing ferrous-chelate complex according to the present invention is easily adjusted merely by adding ferrous compound, such as ferrous salt, and chelate ligand to an aqueous solution.

The nitric oxide absorbed in the aqueous solution is separated and recovered by a suitable manner. For example, by heating the aqueous solution containing nitric oxide in the chelate complex NO gas can be isolated.

For increasing the absorbility of NO in the aqueous solution, it is preferable to adjust the pH value 2 or more. On the other hand, the separation of NO from the liquid is performed when the liquid is acidic much advantageously than when the liquid is neutral or alkaline. Further, when gas includes $SO_2$ 50 ppm or more, the $SO_2$ is also absorbed in the liquid. If pH of the liquid is 6 or more, side reaction between the absorbed NO and $SO_2$ is taken place in the liquid. Consequently, the removal ratio of NO from the liquid is decreased. In addition, it is necessary to provide a step for treating the side reaction product, which is disadvantageous in the industrial operation. Therefore, pH value must be adjusted between 2 and 6. According to experimental data, it has been found that the pH value is preferable between 2 and 5.5 in the industrial operation.

The method for removing nitric oxide (NO) in gas will be explained by referring to the annexed drawing which shows a schematic view of an apparatus for practicing one method, according to the present invention, for removing nitric oxide (NO) in gas.

In the drawing, the reference numeral 1 indicates an absorption tower, 2 an inlet of the absorption tower through which the nitric oxide (NO) containing gas is introduced, 3 an outlet of the absorption tower, 4 an opening for introducing pH adjusting liquid, 5 an electrode for measuring pH, 6 a bubbler, 7 a stirrer, and 8 a pH measuring apparatus. The absorbent liquid is prepared by combining ferrous ion with chelate ligands, such as EDTA (ethylenediaminetetraacetate such as disodiumethylenediaminetetraacetate and tetrasodiumethylenediaminetetraacetate), CyDTA (Cyclohexanediaminetetraacetate), NTA (nitrilotriacetate), HEDTA (hydroxyethylenetriacetate), DTPA (diethylenetriaminepentaacetate), 2-HxG (dihydroxyethylglycine), CEDTA (glycoletherdiaminetetraacetate), ED (ethylenediamine), glycine, acetylacetone, polybasic carboxylic acid and salts thereof. In this application we have used the term "edta" to designate the individual complex "ethylenediaminetetraacetate" and we have used the term "EDTA" in the generic sense to refer to various salts or acids, including the edta complex.

The absorbent liquid is introduced into the absorption tower 1 and the pH is adjusted to a proper value within 2 to 5.5. The gas containing NO is introduced through the gas inlet 2 and contacted with the aqueous solution in the form of bubbles with the aid of the bubbler 6 to effect the gas-liquid contact. The stirrer 7 is turned only enough to prevent the deposition of suspended matter. Preferable pressure is between 1 to 10 atm and temperature is room temperature to 80° C. preferable 40° C. to 80° C. NO concentration of gas to be treated is 100 ppm to 3000 ppm. The concentration of nitric oxide (NO) in the outlet gas can be measured every 10 minutes by the PDS method (Phenol Di-sulfonic Acid Procedure A.S.T.M. D 1608).

EXAMPLE 1

As EDTA, disodiumethylenediaminetetraacetate (2Na.2H.edta) is used. Aqueous solution is prepared by mixing 0.5 mol/l of 2Na.2H.edta with 0.21 mol/l of $FeSO_4.7H_2O$. The produced liquid is a mixed aqueous solution of $Na[Fe^{II}edta.H]$ and $Na_2[Fe^{II}edta]$. The liquid is designated hereinafter as $Fe^{II}EDTA$. 300cc of the absorbent liquid $Fe^{II}EDTA$ is introduced into an absorption tower of 320 mm in height and 40 mm in inside diameter and agitated for about 10 minutes by the stirrer 7 to stabilize the pH value. The pH of the absorbent liquid becomes stable at about 2.6 and a pink precipitate suspended in the liquid is visible. Nitric oxide (NO) containing test gas (416 ppm of NO, 3% of oxygen and the remainder $N_2$) is introduced from the bubbler 6 through the gas inlet 2 at a flow rate of 1.0 l/min at 45° C. under atmospheric pressure. The absorption reaction then starts, and pH gradually decreases with time. NaOH aqueous solution is added in a proper amount from the addition opening 4 to adjust pH to a range of 2.0–2.6, when pH becomes 2 or lower.

One hour after starting of absorption reaction, the concentration of nitric oxide (NO) is the outlet gas is 32 ppm and the rate of denitration is 92%.

If concentration of the ferrous chelate is low, the amount of solution required for absorbing a given amount of NO is increased, while if concentration is high, certain restrictions are imposed from the aspect of solubility of $Fe^{II}EDTA$. Solubility varies according to temperature. That is, the higher the temperature, the greater the solubility. Therefore, the adoptable concentration range varies according to the operating temperature, but if the operation temperature is within the range of room temperature to 80° C., the preferred concentration range is 1 to 40 wt% preferable 2 to 30 wt% of ferrous chelate to water.

It should be understood that the method of the present invention may be performed by any suitable equipment other than illustrated one.

EXAMPLE 2

Another experiment is performed using the same equipment and test gas as used in Example 1. 300cc of a mixed aqueous solution of $Fe^{II}(ed)_3$ which is prepared by mixing 0.10 mol/l of ED with 0.21 mol/l of $FeSO_4$ is used as an absorbent liquid. Temperature and pressure are same as Example 1. One hour after starting of absorption reaction, the concentration of nitric oxide (NO) in the outlet gas is 38 ppm and the pH is between 2 and 3 thus attaining a denitration rate of 91%.

EXAMPLE 3

Another experiment is performed using the same equipment and absorbent liquid under same condition as Example 1. But pH of the liquid is varied by adding NaOH. Each NO concentration in the dischagred gas one hour after the start of reaction and NO removal under each pH is as follows.

| pH | NO concentration (ppm) | NO removal (%) |
|---|---|---|
| 4 | 32 | 92 |
| 5 | 31 | 92.5 |
| 5.5 | 31 | 92.5 |

EXAMPLE 4

Another experiment is performed under same conditions as Example 1, but the temperature of the absorbent liquid is varied. Each NO concentration in the discharged gas is measured one hour after the start of reaction and NO removal at each temperature is as follows.

| Temperature of the absorbent liquid (°C.) | NO concentration (ppm) | NO removal (%) |
|---|---|---|
| 60 | 33 | 92 |
| 80 | 35 | 91.6 |

EXAMPLE 5

Another experiment is performed as Example 1, but NO concentration of introduced gas is fixed at three levels, 100ppm, 500ppm and 1000ppm. NO concentration in the discharged gas is as follows.

| Introduced gas composition | NO concentration in discharged gas (ppm) | NO removal (%) |
|---|---|---|
| NO : 100ppm<br>$O_2$ : 3 vol %<br>$N_2$ : remainder | 8 | 92.0 |
| NO : 1000ppm<br>$O_2$ : 3 vol %<br>$N_2$ : remainder | 45 | 95.5 |
| NO : 500ppm<br>$SO_2$ : 500ppm<br>$O_2$ : 3 vol %<br>$N_2$ : remainder | 35 | 93 |

EXAMPLE 6

Experiment is performed under same conditions as Example 1, but pressure of the introduced gas is varied. NO concentration is as follows.

| Pressure of introduced gas | NO concentration of discharged gas | NO removal |
|---|---|---|
| 2 | 17 | 95.9 |
| 5 | 7 | 98.3 |
| 10 | 4 | 99.0 |

EXAMPLE 7—Comparative Testing

Experiment is performed in the same equipment as Example 1 under same gas conditions as Example 1, but absorbent liquids are as follows.

| Absorbent liquid | Composition of the absorbent liquid | | |
|---|---|---|---|
| $Mn^{II}EDTA$ | EDTA (2Na . 2H . edta) 0.5 mol/l | + $MnSO_4$ | 0.21 mol/l |
| $Fe^{III}EDTA$ | " | + $Fe_2(SO_4)_3$ | 0.105 mol/l |
| $Ni^{II}EDTA$ | " | + $NiSO_4$ | 0.21 mol/l |
| $Cu^{II}EDTA$ | " | + $CuSO_4$ | 0.21 mol/l |

300cc of each absorbent liquid is used and pH is kept 5.5 by adding NaOH and temperature of the liquid is 45° C. NO concentration in the discharged gas one hour after is as follows. Data on the $Fe^{II}$ complex in Example 3 is included in the following table for purposes of comparing the various rates of denitration:

| Absorbent liquid | NO concentration (ppm) | NO removal (%) |
|---|---|---|
| $Mn^{II}EDTA$ | 408 | 2.0 |
| $Fe^{III}EDTA$ | 410 | 1.5 |
| $Ni^{II}EDTA$ | 410 | 1.5 |
| $Cu^{II}EDTA$ | 409 | 1.7 |
| $Fe^{II}EDTA$ (Example 3) | 31 | 92.5 |

EXAMPLE 8

Equipment and gas are same as that of Example 1. Absorbent liquid is prepared by mixing 0.21 mol/l of NTA and 0.21 mol/l of $FeSO_4$. 300cc of the liquid of pH 4.0 is used and temperature is 25° C. One hour after starting the absorption reaction, the concentration of NO in the outlet gas was 79 ppm and denitration rate of 81% was attained.

EXAMPLE 9

Another experiment is performed using the same equipment and gas as used in Example 1. The absorbent liquid is prepared by mixing 0.21 mol/l of DTPA and 0.21 mol/l of $FeSO_4$ and adjusted pH 5.5 and temperature is 25° C. The concentration of NO was 92 ppm and denitration rate was 78%.

What is claimed is:

1. A process for removing nitric oxide in an industrial gas containing nitric oxide which comprises contacting said gas with an aqueous solution consisting essentially of a ferrous chelate complex produced by combining ferrous ion and a chelate ligand in water, the aqueous solution having a pH between 2 and 3, whereby said solution reacts with the nitric oxide in said industrial gas and absorbs it into said chelate complex as a nitrosyl ligand.

2. The process according to claim 1 wherein the chelate ligand is selected from the group consisting of ethylenediaminetetraacetate, cyclohexanediaminetetraacetate, ethylenediamine, glycine, acetylacetone and polybasic carboxylic acid.

3. The process according to claim 1 wherein the industrial gas contains about 416 ppm of NO.

4. The process according to claim 3 wherein the denitration rate is in the range of about 92%.

5. The process according to claim 1 wherein the gas is a combustion gas.

6. The process according to claim 1 wherein the gas is a combustion including $SO_2$ 50 ppm or more.

7. The process according to claim 1 wherein the gas is a nitric acid plant discharge gas.

8. The process according to claim 1 wherein the chelate ligand is ethylenediaminetetraacetate.

9. The process according to claim 8 wherein the pH is in the range of 2.0–2.6.

* * * * *